United States Patent
Xie et al.

(10) Patent No.: US 12,033,262 B2
(45) Date of Patent: Jul. 9, 2024

(54) LEARNING CHARACTER MODEL ANIMATIONS WITH A LAYER-WISE MIXTURE-OF-EXPERTS NETWORK

(71) Applicant: Electronic Arts Inc., Redwood City, CA (US)

(72) Inventors: Zhaoming Xie, Palo Alto, CA (US); Wolfram Sebastian Starke, Edinburgh (GB); Harold Henry Chaput, Castro Valley, CA (US)

(73) Assignee: Electronic Arts Inc., Redwood City, CA (US)

( * ) Notice: Subject to any disclaimer, the term of this patent is extended or adjusted under 35 U.S.C. 154(b) by 169 days.

(21) Appl. No.: 17/657,469

(22) Filed: Mar. 31, 2022

(65) Prior Publication Data
US 2023/0316615 A1    Oct. 5, 2023

(51) Int. Cl.
*G06T 13/40*   (2011.01)
*A63F 13/57*   (2014.01)
*G06N 20/00*   (2019.01)
*G06T 13/80*   (2011.01)

(52) U.S. Cl.
CPC ............. *G06T 13/40* (2013.01); *A63F 13/57* (2014.09); *G06N 20/00* (2019.01); *G06T 13/80* (2013.01)

(58) Field of Classification Search
CPC ......... G06T 13/40; G06T 13/80; A63F 13/57; G06N 20/00
See application file for complete search history.

(56) References Cited

U.S. PATENT DOCUMENTS

| | | | | |
|---|---|---|---|---|
| 5,261,041 | A * | 11/1993 | Susman | .................. G06T 13/00 345/643 |
| 6,714,201 | B1 * | 3/2004 | Grinstein | ................ G06T 13/20 700/61 |
| 9,436,760 | B1 * | 9/2016 | Tacchi | ................ G06F 16/9024 |
| 9,787,705 | B1 * | 10/2017 | Love | .................. G06F 16/9024 |
| 10,282,280 | B1 * | 5/2019 | Gouskova | ............... A63F 13/70 |

(Continued)

OTHER PUBLICATIONS

Lee, K., Lee, S., & Lee, J. (2018). Interactive character animation by learning multi-objective control. ACM Transactions on Graphics (TOG), 37(6), 1-10.*

(Continued)

*Primary Examiner* — Sarah Lhymn
(74) *Attorney, Agent, or Firm* — Lee & Hayes, P.C.

(57) ABSTRACT

A computing system may provide functionality for controlling an animated model to perform actions and to perform transitions therebetween. The system may determine, from among a plurality of edges from a first node of a control graph to respective other nodes of the control graph, a selected edge from the first control node to a selected node. The system may then determine controls for an animated model in a simulation based at least in part on the selected edge, control data associated with the selected node, a current simulation state of the simulation, and a machine learned algorithm, determine an updated simulation state of the simulation based at least in part on the controls for the animated model, and adapt one or more parameters of the machine learned algorithm based at least in part on the updated simulation state and a desired simulation state.

18 Claims, 7 Drawing Sheets

(56) References Cited

U.S. PATENT DOCUMENTS

| | | | | |
|---|---|---|---|---|
| 2006/0274070 | A1* | 12/2006 | Herman | G06T 13/20 |
| | | | | 345/473 |
| 2017/0206696 | A1* | 7/2017 | Bailey | G06T 13/40 |
| 2017/0300657 | A1* | 10/2017 | Barrett | G16H 50/50 |
| 2018/0256981 | A1* | 9/2018 | Enomoto | A63F 13/67 |
| 2019/0294976 | A1* | 9/2019 | Vangala | G06F 16/24539 |
| 2019/0303153 | A1* | 10/2019 | Halpern | G06F 15/825 |
| 2019/0318032 | A1* | 10/2019 | Vangala | G06F 16/3329 |
| 2020/0110623 | A1* | 4/2020 | Vangala | G06Q 10/06 |
| 2021/0165481 | A1* | 6/2021 | Brugarolas Brufau | |
| | | | | G06T 15/00 |
| 2022/0051467 | A1* | 2/2022 | Woop | G06T 15/06 |
| 2022/0051476 | A1* | 2/2022 | Woop | G06T 3/4007 |
| 2022/0066456 | A1* | 3/2022 | Ebrahimi Afrouzi | |
| | | | | A47L 9/2873 |
| 2023/0115292 | A1* | 4/2023 | Pappu | G06F 15/7807 |
| | | | | 340/815.45 |

OTHER PUBLICATIONS

Abbas, A. (2020). Adapting Computer Vision Models to Limitations on Input Dimensionality and Model Complexity (Doctoral dissertation, UCL (University College London)).*

* cited by examiner

LEARNING CHARACTER MODEL ANIMATIONS WITH A LAYER-WISE MIXTURE-OF-EXPERTS NETWORK

BACKGROUND

Video gaming allows for players to play a variety of electronic and/or video games alone or with each other via network connectivity, such as via the Internet. With eSports and general game spectating, games are becoming more than just a playing experience for and between players. However, frustration may arise due to one or more of a lack of animated actions available for characters in the video games and the available animated action may be disjointed, may not be able to be performed in succession or may otherwise may cause visual artifacts when performed in succession. These problems may lead to monotony or underwhelming spectating experiences.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
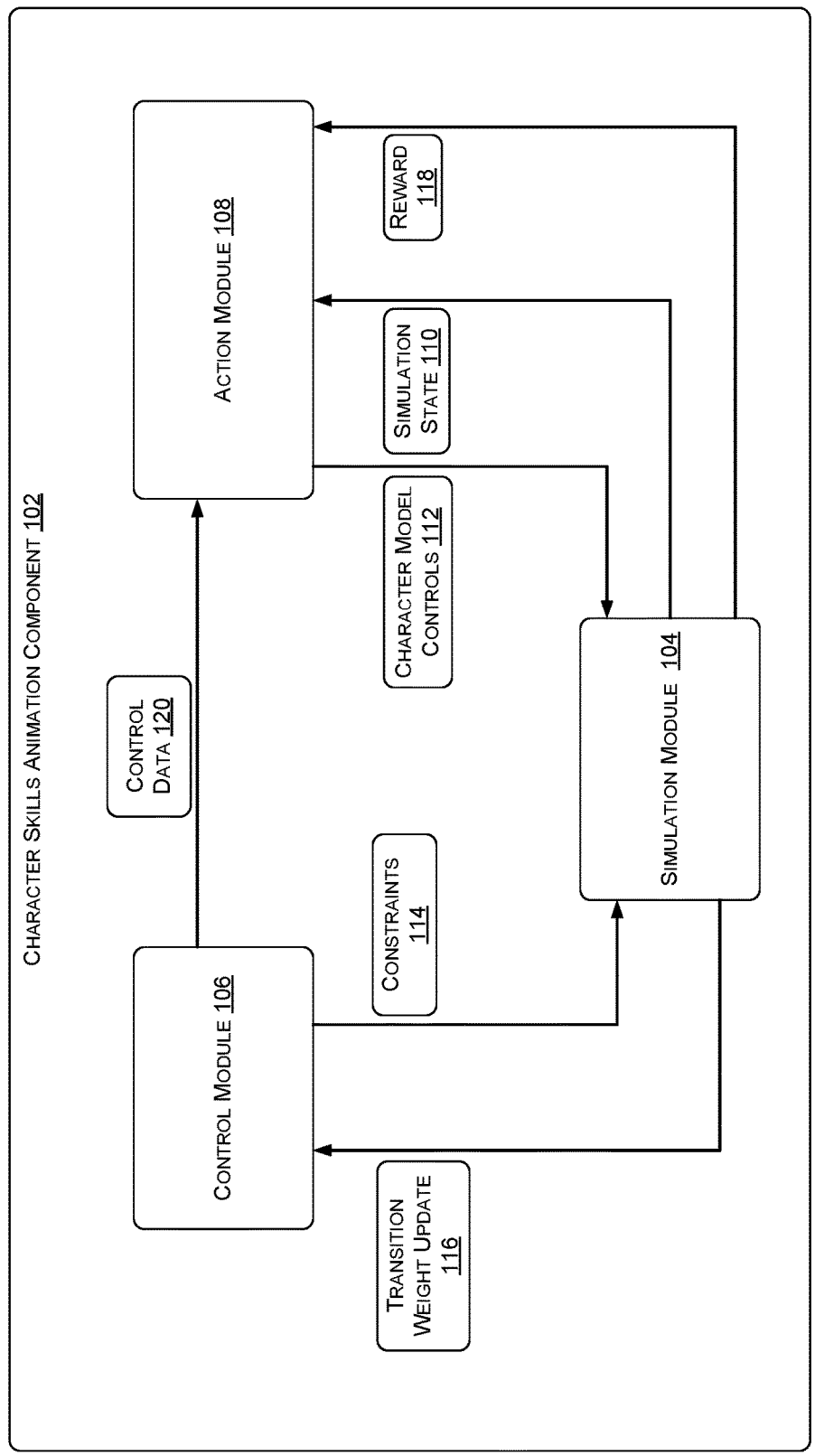
FIG. 1 illustrates an example diagram of a character skills animation component 102 that may provide for controlling an animated model to perform multiple distinct actions and to perform transitions there between using machine learning, in accordance with example embodiments of the disclosure.

Example embodiments of this disclosure describe methods, apparatuses, computer-readable media, and system(s) for controlling an animated model to perform multiple distinct actions and to perform transitions there between using machine learning. Some examples may include a machine learning framework for learning the actions and transitions between the actions. In some examples, the machine learning framework may operate a physics based simulation and use reinforcement learning to learn to control an animated model to perform multiple actions, for example, with regard to another object in the simulation, as well as learning to animate any transitions between the actions. Once trained, the machine learning framework may be incorporated into, for example, a video game, to control animation of models within the video game.

In a soccer video game example, the machine learning framework may control an animated model to perform multiple actions with regard to the soccer ball in the game simulation, such as juggling the ball, performing an around the world trick, and so on as well as animating any transitions between the actions.

In some examples herein, the machine learning framework may include a control component and an action component that interface with a simulation component during training and/or in operation. In general, the control component may provide control data to the action component to indicate the action to be performed by the animated model. The control component may utilize a control graph including nodes for actions and edges for transitions between nodes. During training, the control component may include functionality to perform success-adaptive random walks of the control graph. This may provide for efficient and balanced training of the different actions and the transitions there between.

The action component may operate to determine controls for an animated model in a simulation being generated by the simulation component. For example, the controls may correspond to movements of or commands associated with the animated model to perform the action determined by the control component. Once determined, the action component may output the controls to the simulation component for use in controlling the animated model. The action component may include a layer-wise mixture-of-experts (MOE) network. More particularly, the layer-wise MOE network may include multiple linear MOE layers arranged in series, separated by rectified linear activation functions (ReLUs), with a shared gating network.

The model animation techniques described herein can improve a functioning of a computing device by providing animation controllers that may flexibly combine different actions. For example, the techniques described herein may allow complex interactions between a character model and objects to be synthesized in a physically-plausible manner. For example, the techniques disclosed herein may employ reinforcement learning to synthesize animation controls to perform highly dynamic skills that may use different body parts. Further, the disclosed techniques may avoid a decoupling of the learning of the motions of the model and interactions with other objects, thus allowing for more efficient learning. Furthermore, an animation controller according to the techniques disclosed herein may allow a user to interactively choose what body parts to have interact with other objects at run time. By contrast, playing back prerecorded sequences based on motion capture in a predefined manner may result in a restricted degree of user control and result in blending artifacts. As discussed above, techniques in accordance with this disclosure may overcome such problems. These and other improvements to the functioning of the computer are discussed herein.

As described in further detailed below, the systems and methods described herein are presented for exemplary and illustrative purposes; they are not indicative of applicant's product or implementation plans. Moreover, it should be understood that any reference herein to the use of player or user data would be in compliance with privacy policies that respect players' privacy, and in accordance with player privacy settings or preferences.

Certain implementations and embodiments of the disclosure will now be described more fully below with reference to the accompanying figures, in which various aspects are shown. However, the various aspects may be implemented in many different forms and should not be construed as limited to the implementations set forth herein. For example, some examples provided herein relate to sport, fighting or shooting games. Implementations are not limited to the example genres. It will be appreciated that the disclosure encompasses variations of the embodiments, as described herein. Like numbers refer to like elements throughout.

Figure 5:
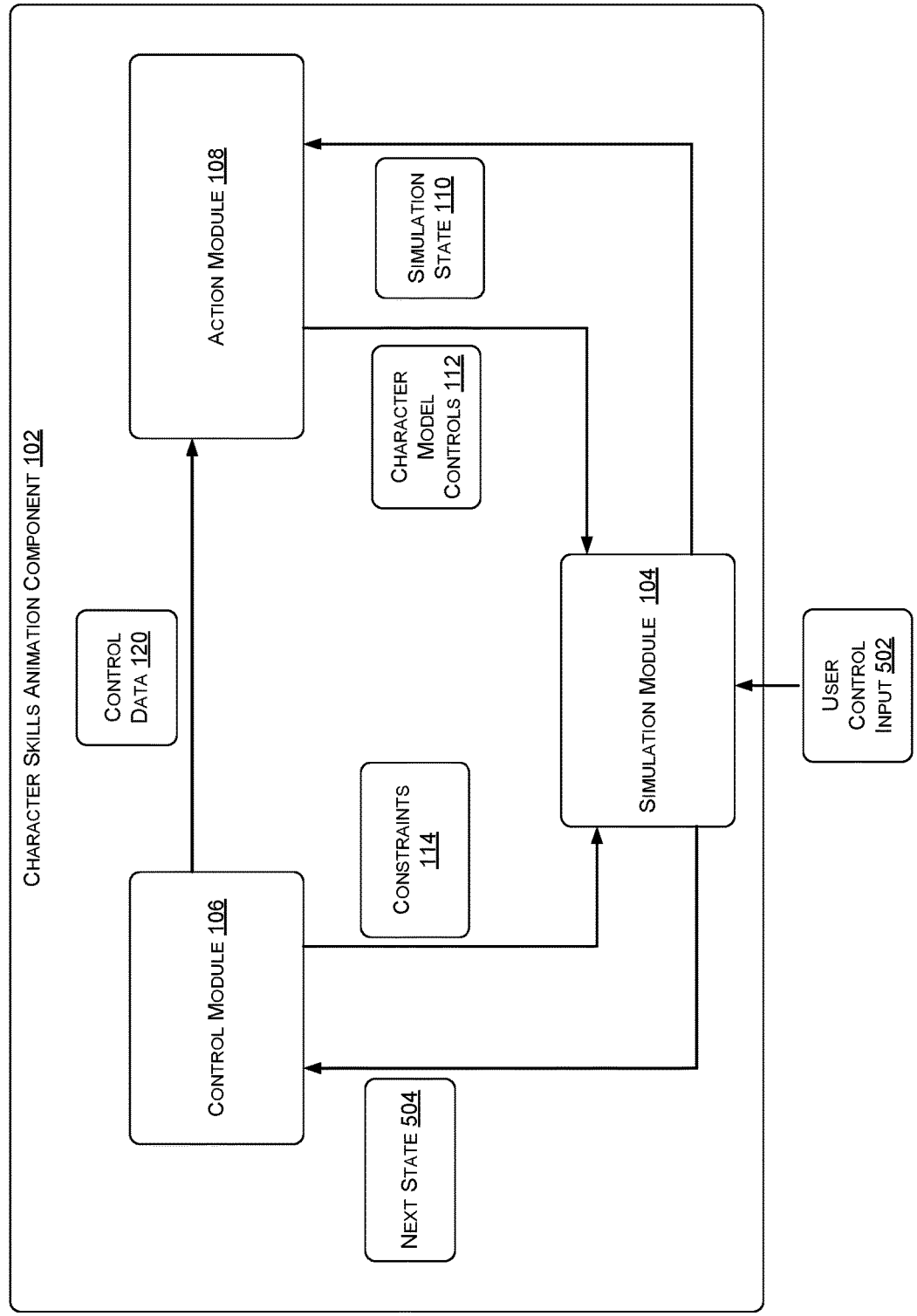
FIG. 5 illustrates a schematic diagram of a character skills animation component, in accordance with example embodiments of the disclosure.

FIG. 1 illustrates an example diagram 100 of a character skills animation component 102 that may provide for controlling an animated model to perform multiple distinct actions and to perform transitions there between using machine learning, in accordance with example embodiments of the disclosure. The character skills animation component 102 may include a simulation module 104, a control module 106 and an action module 108. As illustrated, FIG. 1 shows the character skills animation component 102 in a training configuration for training the control module 106 and the action module 108. FIG. 5 discussed below shows an example of the character skills animation component 102 in an operation configuration that may follow training and may be used in a video game to animate a respective character model.

In operation, the simulation module 104 may operate to determine a simulation state 110 including a model and/or an object with which the model is interacting. In some examples, the simulation module 104 may update the simulation state 110 based on character model controls 112 from the action module 108 and constraints 114 received from the control module 106. For example, in a soccer game example, for an around the world skill, the constraints 114 may include (1) a constraint that enforces the time a body part is allowed to make contact with the ball, (2) a constraint on the relative position between the foot and the ball (e.g., during a time the ball is circling the foot) and the like. The character model controls 112 may include, at each simulation step, a control torque on each joint of the model, which may be usable to determine the movement of the joint during the simulation time step. For example, the simulation module 104 may be a physics engine for rigid-body dynamics simulation and the action module 108 may employ a proportional-derivative (PD) controller to determine character model controls 112 to control the model.

After updating the simulation state, the simulation module 104 may determine if the updated simulation state violates the constraints 114 or otherwise represents a failure (e.g., the animated model falling down or the ball hitting the ground). If not, the simulation module 104 may output the updated simulation state to the action module 108 as simulation state 110. As will be discussed in additional detail below, the simulation module 104 may output a reward 118 to the action module 108 for use in training the machine learned functions of the action module 108. If the constraints 114 are violated or the updated simulation state is in a failure condition, the simulation module 104 may terminate the current iteration and restart the character animation from an initial state.

Additionally or alternatively, the simulation module 104 may determine the current action is complete (e.g., based on the position of the ball or the like). For example, when juggling a soccer ball, the current action may be determined based on whether the ball is moving up or down. When the current action completes, the simulation module 104 may output a transition weight update 116 to the control module 106. The transition weight update may be determined based on whether the current action completed without violating the constraints or otherwise failing. Additional details regarding the transition weight update 116 will be provided below with regard to the control module 106.

The control module 106 may provide control data 120 to the action module 108 to indicate the character action to be performed by the animated model. The control module 106 may utilize a control graph including nodes for actions and edges for transitions between nodes.

Generally speaking, the nodes of the control graph may be associated with actions performed for different stages of animated skills. Taking a soccer game example, for two skills (e.g., right leg juggling and right leg around the world), the control graph may include control nodes based on the stages the ball is in, the body parts to receive the ball and the overall motion of the character. The soccer ball may switch between two stages during the process for each skill: (1) starting with zero vertical velocity in the air and going downwards with gravity, until it hits a body part, (2) starting going upward due to impact with the body parts and reach the maximum height when the upward velocity reaches zero due to deceleration from gravity. As such, the control graph may include four nodes, an up node and a down node for each skill. Each control node may include a variety of control data 120 such as: a phase speed variable; the desired ball trajectory; the desired character motion; a constraint that enforces the time a body part is allowed to make contact with the ball; a constraint that enforces the certain relationship between the motion of the characters and motion of the ball; and so on. In addition, for each node, the control graph may include set of outgoing edges indicates the possible transitions from the current node to other nodes.

As noted above, the transitions between nodes may occur at different stages in animated actions. Continuing the soccer game example, transitions may be determined based on the ball trajectory and character motion with a phase variable, (e.g., $\phi \in [0, 1]$). For example, when the ball is at the peak with zero velocity, the phase $\phi$ may equal 0. The phase $\phi$ may then linearly increase to ½ as the ball goes down until the ball hits the desired body part. The phase $\phi$ may then linearly increase to 1 as ball goes back up until the ball reaches zero velocity at the peak. The phase $\phi$ may then reset to zero and the process may repeat. As such, a transition may occur when the phase $\phi$ is ½ during a down stage or when the phase $\phi$ is 1 in an up stage.

The phase $\phi$ may also be used to compute the desired motion of the character so it is synchronized with the ball trajectory. Further, the phase $\phi$ can increase at different rate for different skills or at different stages of the motion. In a given stage of a skill, the soccer ball will travel in the vertical direction for h meters, starting or ending with zero velocity. The overall duration of the stage can be computed as:

$$t = \sqrt{\frac{2h}{g}}$$

where g is the gravitational constant. The rate of change for ϕ is then:

$$\partial \phi = \sqrt{\frac{g}{8h}}$$

The phase speed may be calculated according to the overall duration of the motion and from the traveling distance of the ball in the vertical direction. The phase variable may then increment with the phase speed variable.

During training, the control module 106 may include functionality to perform success-adaptive random walks of the control graph. In an example, each edge of the control graph may have an initial weight of one (1) or higher and a start node may be randomly selected which is valid for the current state of the simulation. The control module 106 may then determine an edge to traverse from the current node to a next node. To perform the selection, the control module 106 may randomly select an edge based on a weighted random selection routine. The weight of the selected node may be increased by one (1), and the transition may begin. Additionally or alternatively, the control module 106 may preselect a next-next node to transition to following a completion of the next node (e.g., also using a weighted selection). In such a case, the above discussion of selecting a next node following completion of a current node transition may be instead performed for next-next nodes.

As mentioned above, the simulation module 104 may output a transition weight update 116 to the control module 106 upon completion of an action associated with a node. The control module 106 may update a weight associated with the edge traversed to reach the node that has completed. In some examples, the transition weight update 116 may be determined based on whether the action completed without violating the constraints or otherwise failing. If the action completed without violating the constraints or otherwise failing, the edge weight may be reduced, for example, by two (2) unless that would reduce the edge weight to zero. On the other hand, if the action completed with a violation of one or more constraints or otherwise failed, the transition weight update may be zero (0) or may cause the edge weight to be increased, for example, by one (1) up to a maximum weight.

Using the success-adaptive random walks of the control graph, the control module 106 may bias training towards more challenging skill transitions without entirely ignoring skill transitions that have been completed successfully. This may provide for efficient and balanced training of the different actions and the transitions therebetween.

As discussed above, the action module 108 may operate to determine character model controls 112 for an animated model in a simulation being generated by the simulation module 104. For example, the action module 108 may determine the character model controls 112 based on the simulation state 110 from the simulation module 104 and the control data 120 received from the control module 106. The character model controls 112 may cause the animated model to perform movements or animations corresponding to the current action or skill. Once determined, the action module 108 may output the character model controls 112 to the simulation module 104 for use in controlling the animated model.

Continuing the soccer game example, the simulation state 110 and control data 120 may provide the action module 108 with:

The state of the character model, including the height, orientation and angular velocity of the root of the character model in the world space, the joint orientation and joint velocity of each joint;

The state of the soccer ball, this includes the relative position of the ball with respect to the character and the angular velocity of the ball;

The phase and the phase speed.

The current node, the next node and, optionally, the next-next node the control module 106 has selected.

In some examples, preselecting the next-next node and providing that information to the action module 108 may allow the action module 108 to make appropriate decisions where many skills and transitions are possible. For example, if the current node is the ball going down and the foot is about to receive the ball, then depending on whether the next desired skill is foot juggling or head juggling, the foot may need to hit the ball with the appropriate strength so that the ball will reach the appropriate height to accommodate the next skill.

To determine the character model controls 112, the action module 108 may include a layer-wise mixture-of-experts (MOE) network. More particularly, the layer-wise MOE network may include multiple linear MOE layers arranged in series, separated by rectified linear activation functions (ReLUs), with a shared gating network. In operation, the action module 108 may input all or part(s) of the simulation state 110 and control data 120 to the layer-wise MOE network and utilize the output in determining the character model controls 112.

In a soccer video game example utilizing a proportional derivative (PD) controller, at each simulation time step, a control torque is computed via the following equation:

$$\tau = k_p(\theta_d \ominus \theta) - k_d \dot{\theta} + \tau_c$$

where $\theta_d$ and $\theta$ is the desired and current joint orientation of the joints on the character, $\ominus$ computes the difference between two orientations, $k_p$ and $k_d$ is the PD gain for the PD controller, $\tau_c$ is a correction term to compensate any failure causes by the naive PD controller. $\theta_d$ may be a desired joint angle specified by a reference character motion of the character model in the current node for the current phase. The layer-wise MOE network may be utilized to determine $\tau_c$. An example layer-wise MOE network is shown and discussed below with regard to FIG. 2.

Returning to the reward 118 and the training of the layer-wise MOE network, the simulation module 104 may determine the reward based on how closely the simulation state 110 for the current time matches the desired state.

For example, the simulation module 104 may utilize a reward function such as:

$$r = r_{character} + r_{ball}$$

where $r_{character}$ may be defined as:

$$r_{character} = 0.4 r_{joint} + 0.3 r_{translation} + 0.3 r_{orientation}$$

where $$r_{joint} = \exp(-3\|(\theta \ominus \theta_d)\|^2)$$

$$r_{position} = \exp(-\|\dot{x}-\dot{x}_d\|^2 - \|\dot{y}-\dot{y}_d\|^2 - \|z-z_d\|^2)$$

$$r_{orientation} = \exp(-2\|o \ominus o_d\|^2)$$

which may rewards the quantities in joint space, root translational and rotational space being close to the reference motion.

Similarly, $r_{ball}$ may be defined as:

$$r_{ball} = \exp(-\|x_{ball,d} - x_{ball} + x\|^2 - \|y_{ball,d} - y_{ball} + y\|^2 - 5\|z_{ball,d} - z_{ball}\|^2)$$

where $x_{ball,d}$ and $y_{ball,d}$ are calculated based on the body part to contact the ball, and $z_{ball,d}$ is the desired vertical ball location.

Using the rewards 118, the action module 108 may utilize a reinforcement learning algorithm such as Proximal Policy Optimization (PPO) to train the layer-wise MOE network. Of course, one of skill in the art would understand that other learning algorithms may be utilized to train the layer-wise MOE network based on the rewards. Further, one of ordinary skill in the art would also understand that other calculations for the reward would be utilized for other actions and that the examples above are not limiting.

Figure 2:
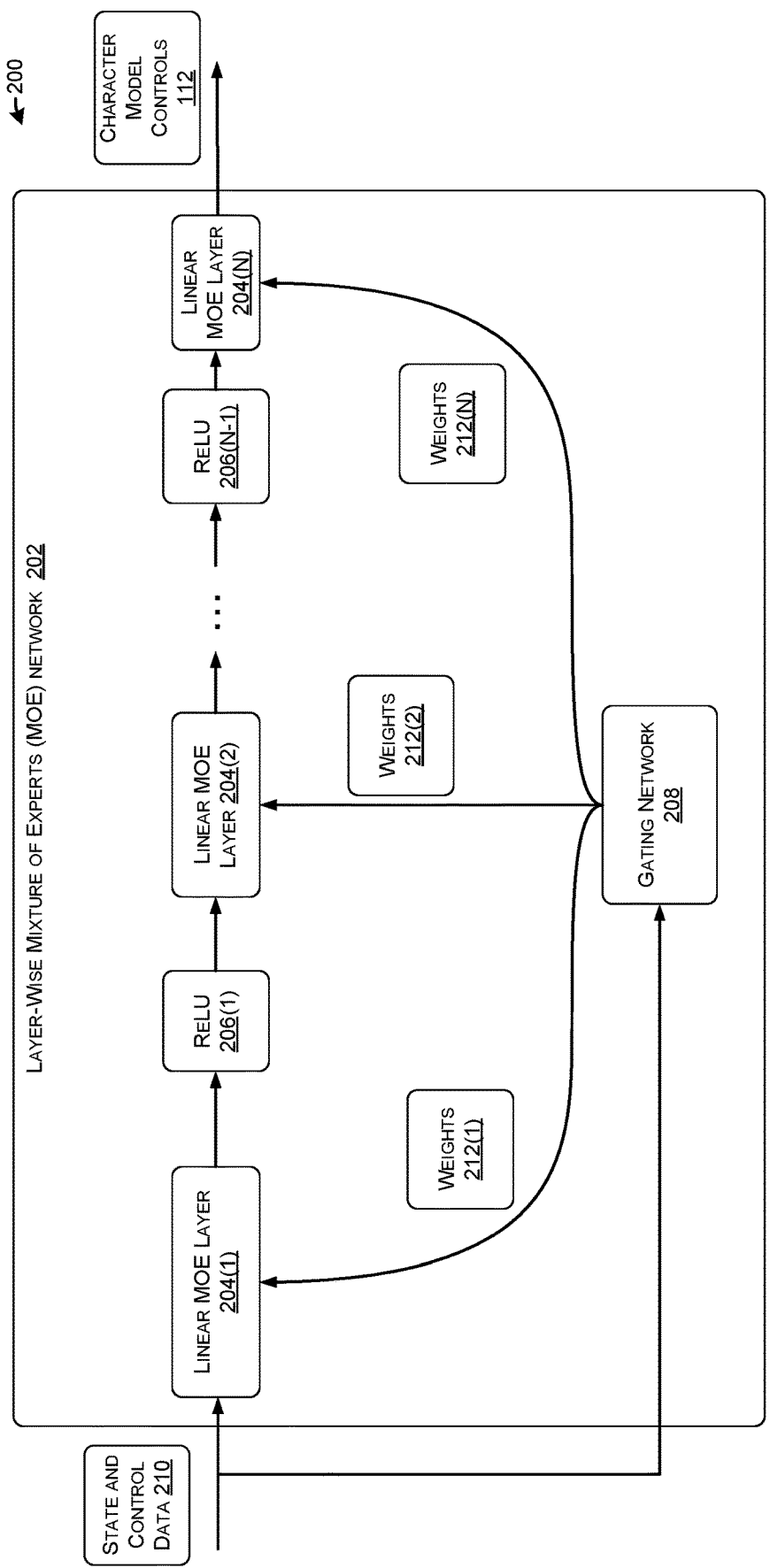
FIG. 2 illustrates a schematic diagram of an example layer-wise mixture-of-experts (MOE) network that may provide functionality for controlling an animated model to perform multiple distinct actions and to perform transitions there between using machine learning, in accordance with example embodiments of the disclosure.

FIG. 2 illustrates a schematic diagram 200 of an example layer-wise MOE network 202 that may provide functionality for controlling an animated model to perform multiple distinct actions and to perform transitions there between using machine learning. As illustrated, the example layer-wise MOE network 202 includes linear MOE layers 204(1), 204(2), ..., 204(N), rectified linear activation functions (ReLUs) 206(1), ... 206(N-1), and a gating network 208.

As illustrated, the layer-wise MOE network 202 may include multiple linear MOE layers 204(1)-204(n) arranged in series, separated by ReLUs 206(1)-206(N-1), with a shared gating network 208. In operation, the layer-wise MOE network 202 may receive the state and control data 210 (e.g., simulation state 110 and control data 120). All or part(s) of the state and control data 210 may be input to the linear MOE layer 204(1) and the gating network 208. For example, all or part(s) of the state and control data 210 may be input to input nodes of the linear MOE layer 204(1) and the gating network 208. The shared gating network 208 may be used to generate the expert weights 212(1), 212(2), ..., 212(N) for the linear MOE layers 204. The linear MOE layer 204(1) may utilize the expert weights 212(1)-212(N) to determine outputs. The outputs of the linear MOE layer 204(1) may be provided to ReLU 206(1) which applies an activation function. The output of ReLU 206(1) may be provided to linear MOE layer 204(2). This process may continue until linear MOE layer 204(N) may output character model controls 112 or value(s) utilized by the action module to determine character model controls 112.

As discussed above, the output of the layer-wise MOE network 202 may be utilized to determine character model controls for an animated model. Further, a reinforcement learning algorithm may be applied to the layer-wise MOE network 202 based on the resulting simulation state to train the layer-wise MOE network 202.

Figure 3:
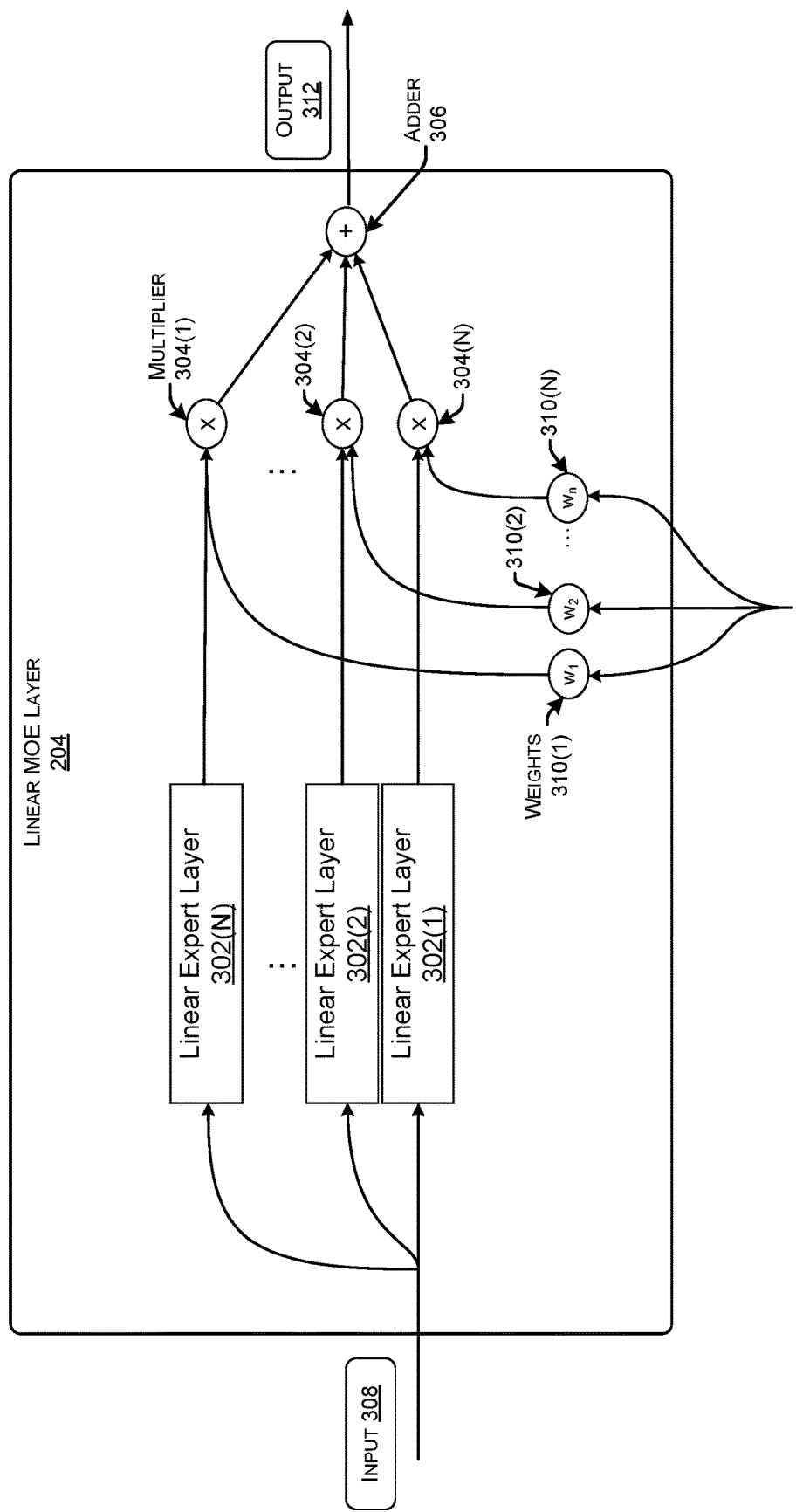
FIG. 3 illustrates a schematic diagram of an example linear mixture-of-experts (MOE) layer that may provide functionality for controlling an animated model to perform multiple distinct actions and to perform transitions there between using machine learning, in accordance with example embodiments of the disclosure.

FIG. 3 illustrates a schematic diagram 300 of an example linear MOE layer 204 that may provide functionality for controlling an animated model to perform multiple distinct actions and to perform transitions therebetween using machine learning. As illustrated, the example linear MOE layer 204 may include linear expert layers 302(1), 302(2), ..., 302(N), multipliers 304(1), 304(2), ... 304(N), and an adder 306.

In operation, each linear expert layer 302 may receive the input 308 and provide an output to a respective multiplier 304. The multipliers 304 may receive and determine the product of the output of the respective linear expert layer 302 and a respective weight 310. As discussed above, the weights 310 may be received from the shared gating network 208. The adder 306 may receive and determine the sum of the products determined by the multipliers 304. The adder may then output the sum as the output 312 of the linear MOE layer 204.

Figures 4A, 4B:
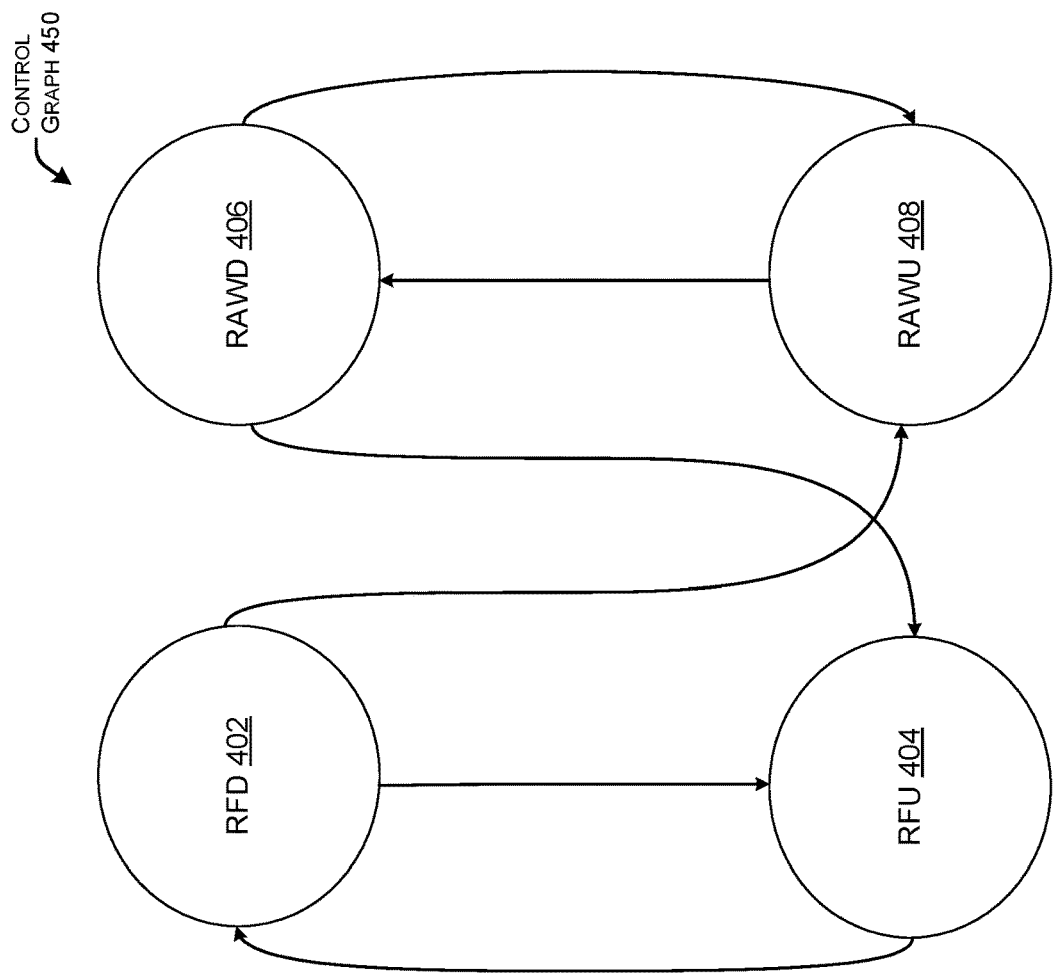
FIG. 4A illustrates a control table that may represent an initial control graph for a control module for two skills in a soccer video game, in accordance with example embodiments of the disclosure.
FIG. 4B illustrates a control graph based on the control table of FIG. 4A, in accordance with example embodiments of the disclosure.

FIG. 4A illustrates a control table 400 that may represent an initial control graph for the control module 106 for two skills in a soccer video game. More particularly, the control table 400 may include information for a right foot juggle skill and a right foot around the world skill. As discussed above, the skills may be split into two actions or stages based on the movement of the soccer ball. Specifically, the right foot juggle skill may be represented as a down node, RFD, and an up node, RFU. Similarly, the right foot around the world skill may be represented as a down node, RAWD, and an up node, RAWU. An entry of one (1) in a cell of the control table 400 may indicate a directed edge from the node represented by the row of the cell to the node represented by the column of the cell. For example, the one in the third row and second column of the control table 400 may indicate the control graph includes a directed edge from the right foot up (RFU) node to the right foot down node (RAWD).

FIG. 4B illustrates a control graph 450 based on control table 400. As illustrated, the control graph includes four nodes 402-408 with directed edges as discussed above for FIG. 4A. Generally, speaking two nodes N1 and N2 can be connected if at least one of: (1) the end pose of N1 matches the starting pose of N2 (e.g., two nodes of the same skill), or (2) the ball position at the end of N1 relative to the body matches the ball position at the beginning of N2 (e.g., N1 is a down node and N2 is an up node).

FIG. 5 illustrates a schematic diagram 500 of the character skills animation component 102 of FIG. 1 in an operation configuration that may follow training and may be used in a video game to animate a respective character model.

In particular, in FIG. 5, the simulation module 104 may receive a user control input 502 which may specify or be determinative of the next action for the character model. In an example, a soccer videogame may provide for a selection wheel which may allow the user to select various skills for the model to perform. In some examples, the selection wheel may not allow for selection of skills which cannot be validly transitioned to from a current state.

In turn, the simulation module 104 may output a next state 504 to the control module 106. The next state 504 may indicate the next control node, an edges to traverse, or skill. In examples in which the next state 504 indicates a skill, the control module 106 may operate to determine an edge from a current node to a node associated with the indicated skill, if any. If no transitions are currently available from the current node to a node associated with the indicated skill, the control module 106 may operate to transition to a neutral state from which a node associated with the indicated skill is reachable.

In FIG. 5, the simulation module 104 may not determine rewards 118 and the action module 108 may not perform machine learning operations. The other modules of FIG. 5 may operate in a similar manner to that discussed above with regard to FIG. 1.

Variations would be apparent based on this disclosure and the embodiments are not limited to the examples discussed herein.

Figure 6:
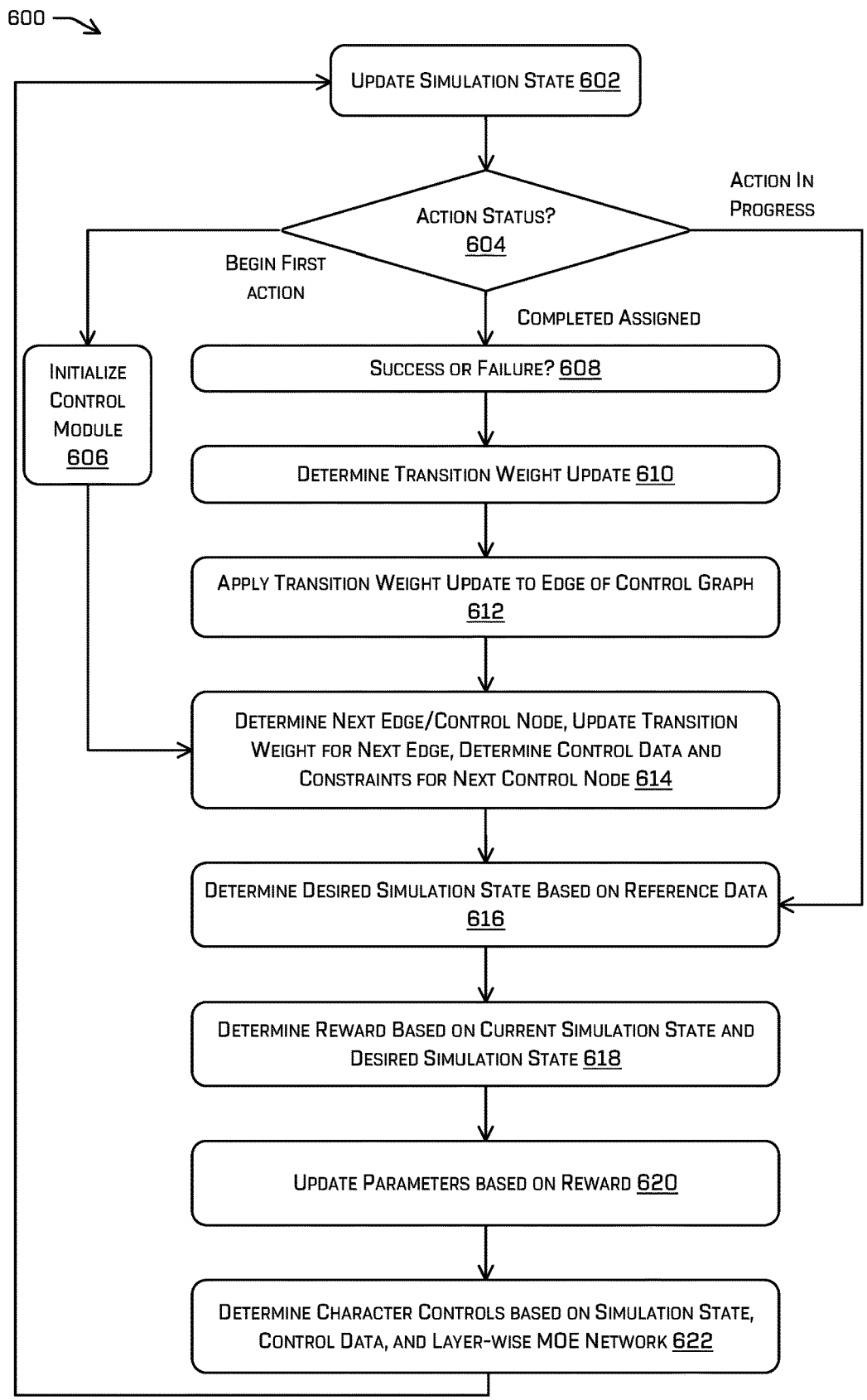
FIG. 6 illustrates a flow diagram of an example method that may provide functionality for controlling an animated model to perform multiple distinct actions and to perform transitions there between using machine learning, in accordance with example embodiments of the disclosure.

FIG. 6 illustrates a flow diagram of an example method 600 that may provide functionality for controlling an animated model to perform multiple distinct actions and to perform transitions therebetween using machine learning, in accordance with example embodiments of the disclosure. The method 600 may be performed by a client device including a character skills animation component. More particularly, the method 600 may relate to the operations of a client device to provide functionality for controlling an animated model to perform multiple distinct actions and to perform transitions therebetween using machine learning.

At block 602, the character skills animation component may update a simulation state. At 604, the character skills animation component may determine a current action status. If the character skills animation component has been instructed to begin training (e.g., perform a first action), the process may continue to block 606 where the character skills animation component may operate to initialize the control module. The process may then continue to block 614.

Returning to block 604, if the character skills animation component has completed an assigned action, the process may continue to block 608. Alternatively, at block 604, if an action is in progress at the character skills animation component, the process may continue to block 616.

At block 608, the character skills animation component may determine whether the completed assigned action was a success or failure. At 610, the character skills animation component may determine a transition weight update for the edge of the control graph the character skills animation component followed to reach the current node based on whether the assigned action was successful or a failure. As discussed above, in some examples, the transition weight update may be zero when the assigned action was a failure and a negative number (e.g., −2) when the assigned action was a success. This may result in edges associated with success being deemphasized by the weighted random selection process of the success-adaptive random walks of the control graph. At block 612, the character skills animation component may apply the transition weight update to the edge followed to reach the current node of the control graph.

At block 614, the character skills animation component may operate to determine a next control node of the control graph (e.g., using success-adaptive random edge selection), update the transition weight for the next edge (e.g., the edge being traverse to reach the next control node), determine control data for the next control node, and determine constraints for the next control node. These operation may be performed as discussed above regarding FIG. 1.

Next, at block 616, the character skills animation component may determine a desired simulation state based on reference data. For example, the control data for the next control node may include reference data such as motion capture reference data that may be processed using phase information or similar operations.

At block 618, the character skills animation component may operate to determine reward(s) based on the current simulation state and the desired simulation state. The character skills animation component may then update parameters of the action module (e.g., the layer-wise MOE network weights) based on the reward(s).

Then, at block 620, the character skills animation component may determine character model controls based on the simulation state, the control data, and the updated layer-wise MOE network. The process may then return to 602 for additional iterations.

It should be noted that some of the operations of method 600 may be performed out of the order presented (e.g., block 618 could be performed by block 616 in some embodiments), with additional elements, and/or without some elements. Some of the operations of method 600 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 7:
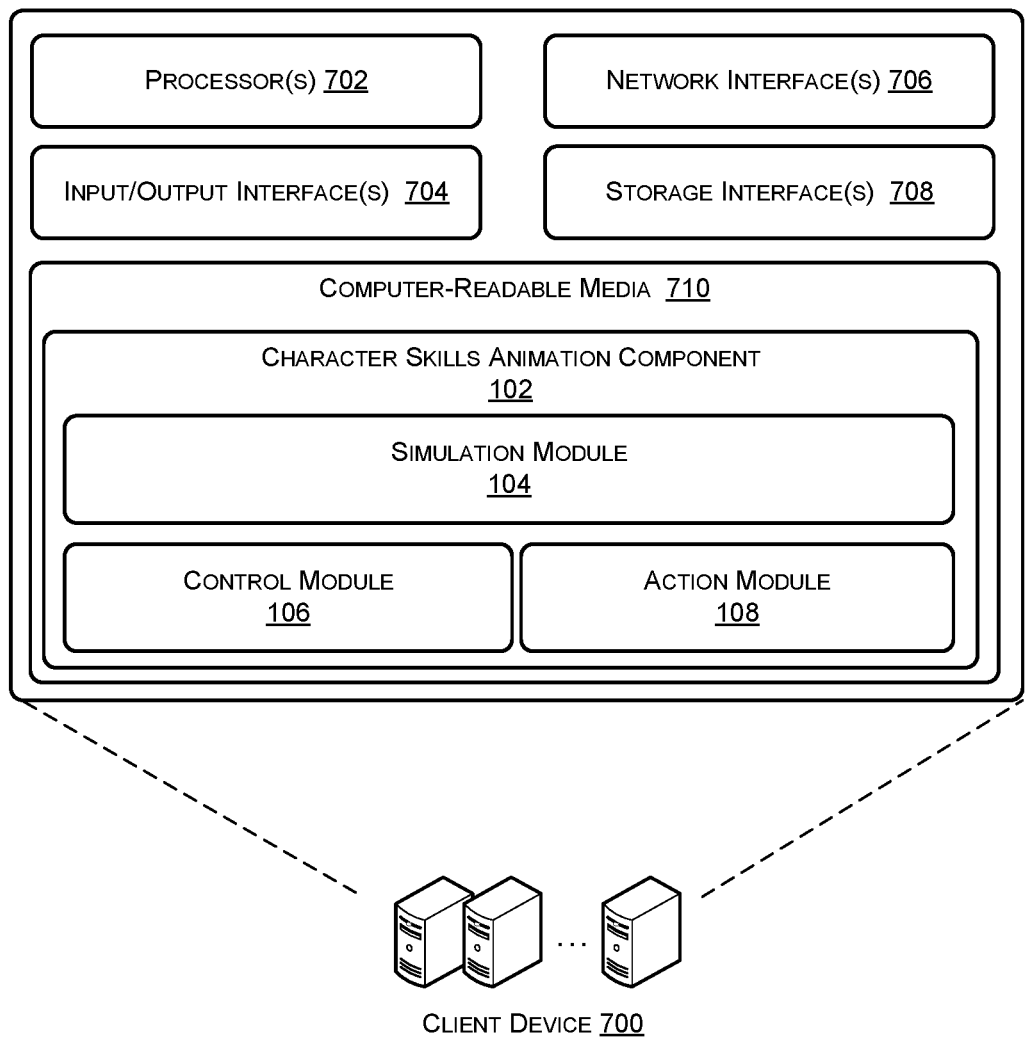
FIG. 7 illustrates a block diagram of example client device(s) that may provide functionality for controlling an animated model to perform multiple distinct actions and to perform transitions there between using machine learning, in accordance with examples of the disclosure.

FIG. 7 illustrates a block diagram of example client device(s) 700 that may provide functionality for controlling an animated model to perform multiple distinct actions and to perform transitions therebetween using machine learning, in accordance with examples of the disclosure. The client device(s) 700 may include one or more processor(s) 702, one or more input/output (I/O) interface(s) 704, one or more network interface(s) 706, one or more storage interface(s) 708, and computer-readable media 710.

In some implementations, the processor(s) 702 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 702 may possess its own local memory, which also may store program modules, program data, and/or one or more operating system(s). The one or more processor(s) 702 may include one or more cores.

The one or more input/output (I/O) interface(s) 704 may enable the client device(s) 700 to detect interaction with a user and/or other system(s), such as one or more game system(s). The I/O interface(s) 704 may include a combination of hardware, software, and/or firmware and may include software drivers for enabling the operation of any variety of I/O device(s) integrated on the client device(s) 700 or with which the client device(s) 700 interacts, such as displays, microphones, speakers, cameras, switches, and any other variety of sensors, or the like.

The network interface(s) 706 may enable the client device(s) 700 to communicate via the one or more network (s). The network interface(s) 706 may include a combination of hardware, software, and/or firmware and may include software drivers for enabling any variety of protocol-based communications, and any variety of wireline and/or wireless ports/antennas. For example, the network interface(s) 706 may comprise one or more of a cellular radio, a wireless (e.g., IEEE 802.1x-based) interface, a Bluetooth® interface, and the like. In some embodiments, the network interface(s) 706 may include radio frequency (RF) circuitry that allows the client device(s) 700 to transition between various standards. The network interface(s) 706 may further enable the client device(s) 700 to communicate over circuit-switch domains and/or packet-switch domains.

The storage interface(s) 708 may enable the processor(s) 702 to interface and exchange data with the computer-readable medium 710, as well as any storage device(s) external to the client device(s) 700.

The computer-readable media 710 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 710 may be implemented as computer-readable storage media (CRSM), which may be any available physical media accessible by the processor(s) 702 to execute instructions stored on the computer readable media 710. In one basic implementation, CRSM may include RAM and Flash memory. In other implementations, CRSM may include, but is not limited to, ROM, EEPROM, or any other tangible medium which can be used to store the desired information and which can be accessed by the processor(s) 702. The computer-readable media 710 may have an operating system (OS) and/or a variety of suitable applications stored thereon. The OS, when executed by the processor(s) 702 may enable management of hardware and/or software resources of the client device(s) 700.

Several functional blocks having instruction, data stores, and so forth may be stored within the computer-readable media 710 and configured to execute on the processor(s) 702. The computer readable media 710 may have stored thereon a character skills animation component 102, a simulation module 104, a control module 106 and an action module 108. It will be appreciated that each of the functional blocks 102-108 may have instructions stored therein that, when executed by the processor(s) 702, may enable various functions pertaining to the operations of client device(s) 700.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing computer-executable instructions that, when executed by the one or more processors, cause the one or more processors to perform operations comprising:
determining, from among a plurality of edges from a first node of a control graph to respective other nodes of the control graph, a selected edge from the first node to a selected node, wherein the plurality of edges includes a first edge from the first node to a second node of the control graph and a second edge from the first node to a third node of the control graph, and the determining of the selected edge uses a random selection algorithm;
determining controls for an animated model in a simulation based at least in part on the selected edge, control data associated with the selected node, a current simulation state of the simulation, and a machine learned algorithm, wherein the machine learned algorithm includes a layer-wise mixture-of-experts (MOE) network comprising a plurality of linear MOE layers arranged in series with a shared gating network;
determining an updated simulation state of the simulation based at least in part on the controls for the animated model; and
adapting one or more parameters of the machine learned algorithm based at least in part on the updated simulation state and a desired simulation state.

2. The system of claim 1, wherein the random selection algorithm comprises a weighted random selection algorithm based at least in part on respective weights of the plurality of edges.

3. The system of claim 2, the operations further comprising:
determining an action associated with the selected node has terminated;
determining whether the action associated with the selected node has succeeded or failed; and
modifying a weight of the selected edge based on whether the action associated with the selected node has succeeded or failed.

4. The system of claim 3, wherein the action is determined to have failed if a constraints on the action associated with the control data was violated.

5. The system of claim 3, wherein the modifying the weight of the selected edge increases a probability of the selected edge being determined from among the plurality of edges based on a determination the action associated with the selected node failed.

6. The system of claim 1, wherein the first node is associated with a first action to be performed by the animated model determined to have been completed and the selected node is associated with a second action to be performed by the animated model and the selected edge is associated with a transition from the first action to the second action.

7. A computer-implemented method comprising:
determining, from among a plurality of edges from a first node of a control graph to respective other nodes of the control graph, a selected edge from the first node to a selected node, wherein the plurality of edges includes a first edge from the first node to a second node of the control graph and a second edge from the first node to a third node of the control graph, and the determining of the selected edge uses a random selection algorithm;
determining controls for an animated model in a simulation based at least in part on the selected edge, control data associated with the selected node, a current simulation state of the simulation, and a machine learned algorithm, wherein the machine learned algorithm includes a layer-wise mixture-of-experts (MOE) network comprising a plurality of linear MOE layers arranged in series with a shared gating network;
determining an updated simulation state of the simulation based at least in part on the controls for the animated model; and
adapting one or more parameters of the machine learned algorithm based at least in part on the updated simulation state and a desired simulation state.

8. The computer-implemented method of claim 7, wherein the random selection algorithm comprises a weighted random selection algorithm based at least in part on respective weights of the plurality of edges.

9. The computer-implemented method of claim 8, further comprising:
determining an action associated with the selected node has terminated;
determining whether the action associated with the selected node has succeeded or failed; and
modifying a weight of the selected edge based on whether the action associated with the selected node has succeeded or failed.

10. The computer-implemented method of claim 9, wherein the action is determined to have failed if a constraints on the action associated with the control data was violated.

11. The computer-implemented method of claim 9, wherein the modifying the weight of the selected edge increases a probability of the selected edge being determined from among the plurality of edges based on a determination the action associated with the selected node failed.

12. The computer-implemented method of claim 7, wherein the first node is associated with a first action to be performed by the animated model determined to have been completed and the selected node is associated with a second action to be performed by the animated model and the selected edge is associated with a transition from the first action to the second action.

13. One or more computer-readable media storing computer-executable instructions that, when executed by one or more processors, cause the one or more processors to perform operations comprising:
determining, from among a plurality of edges from a first node of a control graph to respective other nodes of the control graph, a selected edge from the first node to a selected node, wherein the plurality of edges includes a first edge from the first node to a second node of the control graph and a second edge from the first node to a third node of the control graph, and the determining of the selected edge uses a random selection algorithm;
determining controls for an animated model in a simulation based at least in part on the selected edge, control data associated with the selected node, a current simulation state of the simulation, and a machine learned algorithm, wherein the machine learned algorithm includes a layer-wise mixture-of-experts (MOE) network comprising a plurality of linear MOE layers arranged in series with a shared gating network;
determining an updated simulation state of the simulation based at least in part on the controls for the animated model; and
adapting one or more parameters of the machine learned algorithm based at least in part on the updated simulation state and a desired simulation state.

14. The one or more computer-readable media of claim 13, wherein the random selection algorithm comprises a weighted random selection algorithm based at least in part on respective weights of the plurality of edges.

15. The one or more computer-readable media of claim 14, the operations further comprising:
determining an action associated with the selected node has terminated;
determining whether the action associated with the selected node has succeeded or failed; and
modifying a weight of the selected edge based on whether the action associated with the selected node has succeeded or failed.

16. The one or more computer-readable media of claim 15, wherein:
the action is determined to have failed if a constraints on the action associated with the control data was violated.

17. The one or more computer-readable media of claim 13, wherein the first node is associated with a first action to be performed by the animated model determined to have been completed and the selected node is associated with a second action to be performed by the animated model and the selected edge is associated with a transition from the first action to the second action.

18. The one or more computer-readable media of claim 15, wherein:
the modifying the weight of the selected edge increases a probability of the selected edge being determined from among the plurality of edges based on a determination the action associated with the selected node failed.

* * * * *